Sept. 24, 1963 W. H. NORTON 3,105,133
ELECTRICALLY HEATED ROLL
Filed May 23, 1960 2 Sheets-Sheet 1
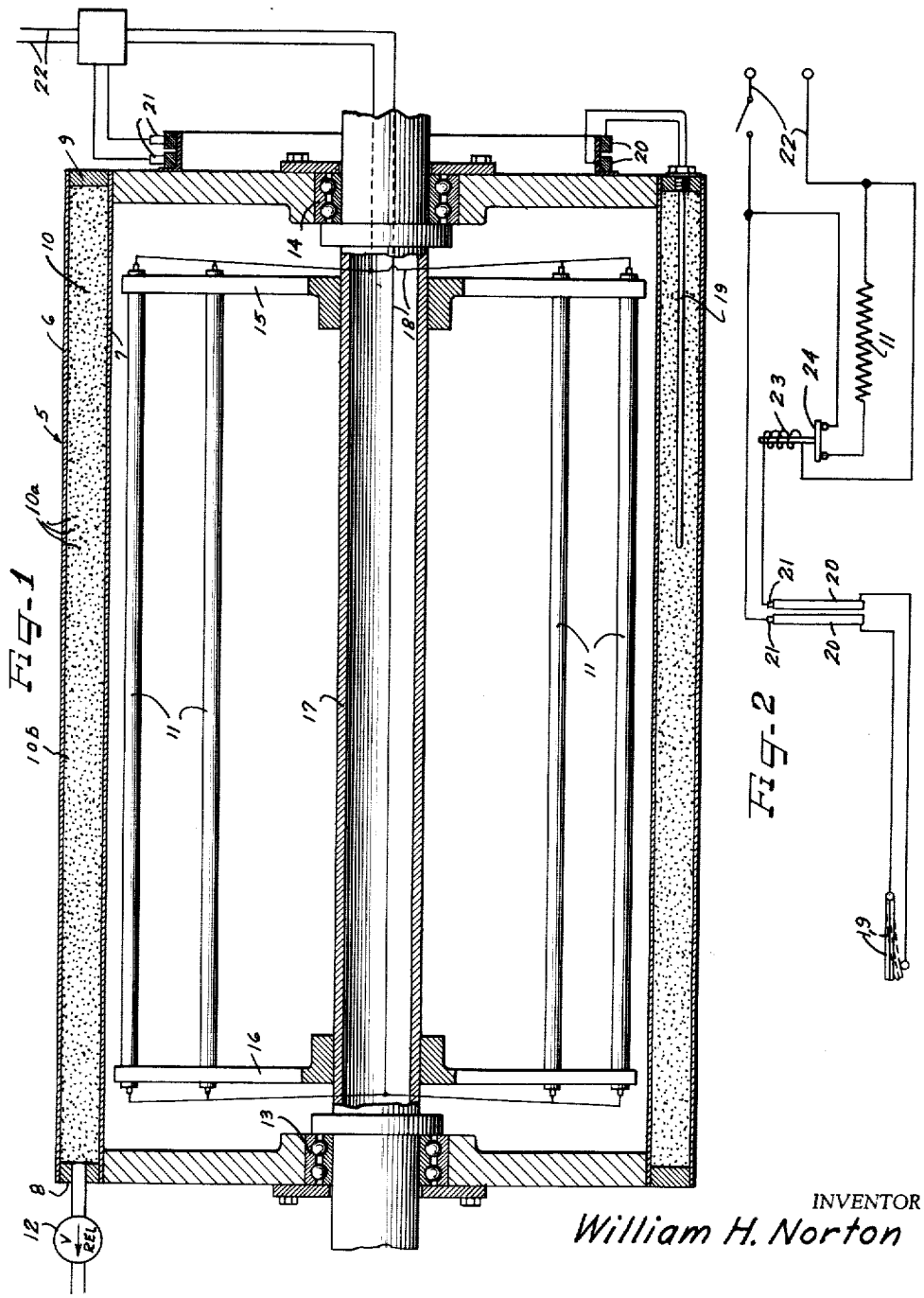
INVENTOR
William H. Norton
BY
Hill, Sherman, Meroni, Gross & Simpson
ATTORNEYS

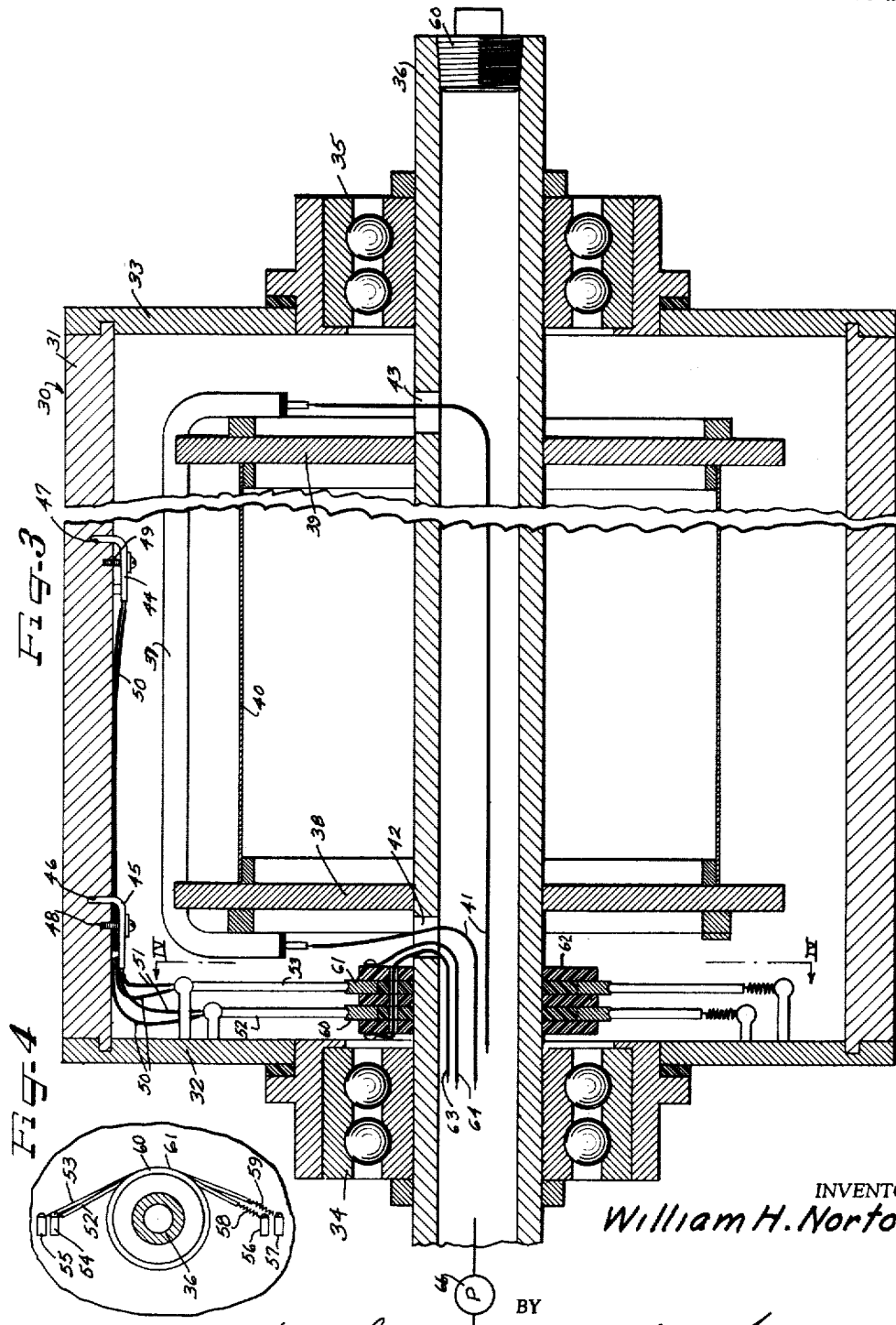

United States Patent Office 3,105,133
Patented Sept. 24, 1963

3,105,133
ELECTRICALLY HEATED ROLL
William H. Norton, Mundelein, Ill., assignor to Thermal Incorporated, Franklin Park, Ill., a corporation of Delaware
Filed May 23, 1960, Ser. No. 30,971
4 Claims. (Cl. 219—19)

This invention relates to an improved heat transfer roll.

More particularly the invention contemplates the provision of an electrically heated heat transfer roll, in one form having a single outer shell and in another form having a cylindrical outer shell with a concentric cylindrical inner shell and a chamber defined between the shells having a heat transfer fluid and preferably a eutectic composition therein. The rolls are rotatably mounted on a hollow shaft and electric heating elements are positioned within the inner shell supplied by electrical conductors which are controlled by a temperature sensitive switch mounted within the chamber between the shells. In another form, the invention contemplates the provision of a roll having an improved means for measuring the temperature of the roll so as to control the heat energy supplied by the heating elements.

An object of the invention is to provide an improved rotary heat transfer roll with double or triple walls and mounted on a fixed shaft wherein the outer wall is heated by stationary electrical heating units with means for transferring the heat to the outer wall thereby eliminating the need for lines for conducting heated fluid to a space between the walls.

Another object of the invention is to provide an improved heat transfer means for a heat transfer roll which will solidify at room temperatures and become liquid at operating temperatures.

A further object of the invention is to provide a heat transfer roll with an improved electrical heating arrangement and improved apparatus for controlling the application of heat and for safely effecting the transfer of heat; and to provide a roll in which the danger of explosions or conflagaration is greatly reduced.

Another object is to provide an improved means for measuring the temperature of a rotating roll and for producing an accurate electrical signal corresponding to temperature.

Other objects and advantages will become more apparent with the teaching of the principles of the invention in connection with the disclosure of the preferred embodiments in the specification, claims and drawings, in which:

FIGURE 1 is a sectional view taken through the axis of a heat transfer roll, shown partially in schematic form, embodying the principles of the present invention;

FIGURE 2 is a diagrammatic view showing the electrical circuit for supplying the energy for the heating elements;

FIGURE 3 is a sectional view taken through another form of heat transfer roll; and FIGURE 4 is a fragmentary sectional view taken substantially along line IV—IV of FIGURE 3.

As shown on the drawings:

As illustrated in FIGURE 1, a rotor 5 includes a plurality of shells, illustrated as including an outer shell 6 with a cylindrical outwardly facing surface for engaging a surface to be heated. The rotor includes an inner shell 7 which is illustrated as cylindrical and concentric with the outer shell 6, and at the ends of the shells are annular end walls 8 and 9 which with the shells define a heat distribution chamber 10.

The chamber 10 is provided with a heat distribution material or preferably a eutectic composition 10a. The eutectic composition will be solid at normal room temperatures and will become liquid at normal heated operating temperatures. A preferred eutectic composition will melt at 275° F. and be usable to 1000° F. Other eutectic compositions which are suitable for certain conditions are usable from 450° F. to 2000° F. A eutectic composition which we have used and found suitable and which is within the preferred range is commercially available under the trade name Quick Temper #275, although other compositions with the above qualifications will be suitable.

The eutectic material will solidify at normal room temperatures and therefore the problem of leakage when the machine is at rest is not present. Heat transfer fluids which tend to damage the materials with which they come in contact are not used and problems of providing positive seals and inspection before usage are avoided.

The eutectic composition may be placed in the chamber 10 when the shells are assembled or it may be placed therein in the fluid state through a filling opening provided for that purpose. The chamber is shown with a fitting 12 for the relief of internal pressures which may develop and this pressure relief valve 12 may be removable so that its connection can be used as a filling opening.

The material in the chamber 10 is preferably arranged so as to not completely fill the entire void and to leave an air space for expansion. In some circumstances it may be acceptable to use a liquid in the chamber 10 instead of a eutectic composition. A liquid such as oil is suitable having a flash point well above the operating temperature. The air space for expansion is shown at 10b and may be only large enough to permit normal heat expansion of the heat transfer material 10a in the chamber 10, inasmuch as the valve 12 will relieve undue expansion due to overheating or the like.

Within the rotor 5 adjacent the inner shell 7 is a heating means, preferably in the form of a plurality of tubular electric heating elements 11. The heating elements are stationary and the rotor 5 is mounted for rotation about its axis on end support bearings 13 and 14. The heating elements are preferably of the tubular type with wire resistance elements embedded in compacted electrical insulating material within the tubes, and extend axially within the rotor. As the rotor is moved in rotation about the heating elements, heat energy is transmitted to the eutectic composition within the chamber 10 to cause it to become liquid, and the liquid composition will evenly distribute the heat energy to the outer shell 6.

The rotor and the heating elements are supported on a shaft 17 shown as being hollow to contain electrical conductors 18 which are connected to the heating elements 11. The elements are stationarily supported at their ends by radial support members 15 and 16 which may be in the form of spiders secured to the shaft. The support bearings 13 and 14 are also mounted on the shaft.

For controllably regulating the heat of the rotor the electric current to the heating elements 11 is controlled by a temperature responsive switch control member 19. This may be of the switch type or of the resistance thermometer type and the arrangement is shown schematically for purposes of illustration in FIGURE 2.

The control 19 is electrically coupled to the circuit through slip ring and brush elements with the slip rings shown at 20 connected to leads from the control 19 and with the brushes as shown at 21 connected to the control circuit. The control circuit is shown for purposes of illustration only as including a relay having a coil 23 which is energized when the control 19 is closed to close a switch 24 energizing the heating elements 11. Electricity is supplied from a supply line 22. As the eutectic composition in the chamber reaches the desired temperature, the switch of the control 19 will thus open the relay switch 24 opening the circuit to the electrical heaters 11. As will be appreciated, various control circuits may be employed.

In operation, the mechanism is connected to the electrical circuit 22 and the electrical heaters 11 are energized to melt the eutectic composition in the chamber 10 to distribute heat to the outer shell 6. The outer shell is brought into contact with a member to be heated and constant temperature is maintained by the control 19.

In the arrangement of FIGURES 3 and 4, a rotor assembly 30 is provided having a cylindrically shaped shell 31 which is provided with radial end walls 32 and 33. The shell is mounted by means of bearings 34 and 35 on a hollow coaxial stationary shaft 36.

Stationarily mounted on the shaft 36 and positioned within the shell 31 in heat transfer relationship thereto are axially extending tubular heating elements 37. The elements are mounted on spiders 38 and 39 which are secured to the shaft 36. Supported between the spiders is an annular reflector 40 for reflecting the heat outwardly toward the shell. Electrical wires 41 are connected to the ends of the heating elements 37 and the wires are led through openings 42 and 43 in the shaft to pass down the center of the hollow shaft 36.

The electrical circuit to the heating elements 37 is controlled by a first thermal responsive element 44 and a second thermal responsive element 45. The first element 44 is mounted to be responsive to the temperature of a shell at a first location, preferably substantially at the axial center of the shell. The second thermal responsive element 45 is axially displaced from the first element and is preferably at the end of the shell. The thermal element 45 has a probe end which projects into an outwardly drilled hole 46 in the shell and the thermal element 44 has a similar probe which projects into a drilled hole 47 in the shell. The elements are held in place such as by screws with a screw 48 threaded into the shell to hold the element 45 in place, and a screw 49 threaded into the shell to hold the element 44 in place.

The thermal responsive elements generate an electrical voltage corresponding to the temperature of the shell and are connected so that their output is an average of the outputs of the two elements 44 and 45. In other words, the elements are connected in multiple so that an average temperature response is received and a temperature between that of the center and of the cooler ends of the shell is provided for a control signal. For this purpose, the electrical wires 50 and 51 are respectively connected to the elements 44 and 45 and each set of leads are connected to two brushes 52 and 53.

The thermal sensitive elements are preferably of the thermocouple type which generate a very small electrical output in the millivolt range. The output circuit must have substantially no resistivity to it which would cause a drop in millivolts and throw off the temperature indication; however, a connector must be provided which will accommodate rotation of the shell.

The brushes 52 and 53 are in the form of an elongated wire or ribbon. The wire brushes are connected to supporting posts 54 and 55 at one end, and supporting posts 56 and 57 at the other end connect to tension springs 58 and 59 which hold the elongated brushes 52 and 53 against slip rings 60 and 61. The rotating slip rings are mounted at an insulating support 62, shown in the form of flat discs held together to support the rings. Wire leads 63 and 64 connect to the rings. The support posts 54 and 55, and 56 and 57 at the ends of the wire brushes are of insulative material.

The wire leads 63 and 64 from the thermal elements will connect to a switch means for controlling the electrical supply to the leads 41 for the heating elements, similar to the connections shown in the arrangement of FIGURE 2.

In a number of environments the shell 6 of FIGURE 1 or the shell 31 of FIGURE 3 will operate in an explosive atmosphere. For example, they may be utilized for rolling films and with heating these films release explosive vapors. If these vapors were permitted to come in contact with the heating element an explosion might take place.

The inside of the shell, as illustrated for example in FIGURE 3, is pressurized with a low pressure on the order of three pounds per square inch, with a non-combustible gas. As shown, one end of the shaft 36 is closed with a plug 60, and a pressure supply line from a pump 66 is connected to the other end of the shaft to deliver a gas such as air. The air pressurizes the inside of the shell through the openings 42 and 43 and the bearings 34 and 35 are such that very little of the pressure is permitted to escape. The leakage of non-combustible gas through the openings which are present prevents any outside gases from entering the shell.

The rotors may be provided with means for driving them in rotation for contact with the surface area that is to be heated or they may be used as an idler with the surface being heated rotating the rotor through friction. These structures may be employed for various heating purposes and can be used for softening thermoplastic materials to seal containers. It is also contemplated to place an embossed outer sleeve over the shell for engagement with material to etch an embossed design in it, for one use of the rotors.

Thus it will be seen that I have provided an improved and simplified electrically heated heat transfer roll which meets the objectives and advantages above set forth. The mechanism avoids disadvantages in structures heretofore available and is reliable and effective in operation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A heat transfer roll comprising an outer cylindrical shell, an inner shell concentric with the outer shell and defining an annular heat transfer chamber therebetween, end walls secured to the ends of the shells for closing the ends of said chamber, a eutectic composition in said chamber being solid at room temperature and flowable at operating temperatures with rotation of the roll, a non-rotatable shaft projecting through the ends of the walls, bearings on the shaft rotatably supporting each of the walls, end supports on the shaft within the inner shell adjacent the end walls having a plurality of radially extending arms, elongated axially extending electric heating elements supported at the ends of the arms adjacent the inner shell for transmitting heat to said eutectic, conductive slip rings secured to one of the end walls and insulated from each other, stationary conductive electrical brushes engaging the rings, an electrical thermal element having an elongated portion extending axially a substantial distance into said chamber into the eutectic and connected to said rings, and an electrical circuit connected to said electrical elements and incorporating said brushes so that the circuit is completed by operation of the thermal element for maintaining a predetermined temperature of the roll.

2. A heat transfer roll comprising an outer cylindrical shell, an inner shell concentric with the outer shell and defining an annular heat transfer chamber therebetween, end walls secured to the ends of the shells for closing the ends of said chamber, a eutectic composition in said chamber being solid at room temperature and flowable at operating temperatures with rotation of the roll, a pressure relief valve communicating with said chamber for relieving excess pressure due to vaporization of said eutectic, a non-rotatable shaft projecting through the ends of the walls, bearings on the shaft rotatably supporting each of the walls, end supports on the shaft within the inner shell adjacent the end walls having a plurality of radially extending arms, elongated axially extending electric heating elements supported at the ends of the arms adjacent the inner shell for transmitting heat to said eutectic, conductive slip rings secured to one of the end walls and insulated from each other, stationary conductive electrical brushes engaging the rings, an electrical thermal element having an elongated portion extending axially a substantial distance into said chamber into the eutectic and connected to said rings, and an electrical circuit connected to said electrical element and incorporating said brushes so that the circuit is completed by operation of the thermal element for maintaining a predetermined temperature of the roll.

3. A heat transfer roll in accordance with claim 1 in which said shaft is hollow and the electrical circuit includes wires extending from one end of the shell to the other within said shaft to connect to the ends of the electric heating elements.

4. A heat transfer roll comprising an outer cylindrical shell, an inner shell concentric with the outer shell and defining an annular heat transfer chamber therebetween, end walls secured to the ends of the shells for closing the ends of said chamber, a eutectic composition in said chamber being solid at room temperature and flowable at operating temperatures with rotation of the roll, a non-rotatable shaft projecting through the ends of the walls, bearings on the shaft rotatably supporting each of the walls, end supports on the shaft within the inner shell adjacent the end walls having a plurality of radially extending arms, elongated axially extending electric heating elements supported at the ends of the arms adjacent the inner shell for transmitting heat to said eutectic, conductive slip rings secured to one of the end walls and insulated from each other, stationary conductive electrical brushes engaging the rings, an electrical thermal element having an elongated portion extending axially a substantial distance into said chamber into the eutectic and connected to said rings, an electrical supply circuit connected to said electrical elements, a relay control switch in said electrical circuit, and a control circuit connected to said relay through said brushes and said thermal element so that the thermal element may control the electrical circuit by a low voltage.

References Cited in the file of this patent

UNITED STATES PATENTS

| | | | |
|---|---|---|---|
| 718,135 | Lester | Jan. 13, | 1903 |
| 1,155,481 | Hadaway | Oct. 5, | 1915 |
| 1,978,081 | Hanson | Oct. 23, | 1934 |
| 2,474,759 | Schmitz | June 28, | 1949 |
| 2,571,426 | Doniak | Oct. 16, | 1951 |
| 2,700,094 | Hosack | Jan. 18, | 1955 |
| 2,701,765 | Codichini et al. | Feb. 8, | 1955 |
| 2,702,334 | Kleist | Feb. 15, | 1955 |
| 2,739,218 | Wennerlund | Mar. 20, | 1956 |
| 2,808,494 | Telkes | Oct. 1, | 1957 |
| 2,859,945 | Kleist | Nov. 11, | 1958 |
| 2,912,556 | Hold | Nov. 10, | 1959 |
| 3,020,283 | Onishi | Feb. 6, | 1962 |

FOREIGN PATENTS

| | | | |
|---|---|---|---|
| 309,291 | Great Britain | Apr. 11, | 1929 |

UNITED STATES PATENT OFFICE
CERTIFICATE OF CORRECTION

Patent No. 3,105,133 September 24, 1963

William H. Norton

It is hereby certified that error appears in the above numbered patent requiring correction and that the said Letters Patent should read as corrected below.

In the grant, lines 2 and 12, and in the heading to the printed specification, lines 3 and 4, for "Thermal Incorporated", each occurrence, read -- Thermel Incorporated --.

Signed and sealed this 24th day of November 1964.

(SEAL)
Attest:

ERNEST W. SWIDER
Attesting Officer

EDWARD J. BRENNER
Commissioner of Patents